(12) United States Patent
Heikkila

(10) Patent No.: US 11,840,845 B2
(45) Date of Patent: Dec. 12, 2023

(54) SLIDING JOINERY

(71) Applicant: Tundra Composites, LLC, White Bear Lake, MN (US)

(72) Inventor: Kurt Heikkila, Marine on the St. Croix, MN (US)

(73) Assignee: Tundra Composites, LLC, White Bear Lake, MN (US)

( * ) Notice: Subject to any disclaimer, the term of this patent is extended or adjusted under 35 U.S.C. 154(b) by 202 days.

(21) Appl. No.: 17/308,173

(22) Filed: May 5, 2021

(65) Prior Publication Data

US 2021/0348395 A1    Nov. 11, 2021

Related U.S. Application Data

(60) Provisional application No. 63/022,102, filed on May 8, 2020.

(51) Int. Cl.
| | | |
|---|---|---|
| *E04F 13/08* | (2006.01) |
| *E04F 13/18* | (2006.01) |
| *C08K 9/04* | (2006.01) |
| *C08K 7/14* | (2006.01) |

(52) U.S. Cl.
CPC ............ *E04F 13/0896* (2013.01); *C08K 7/14* (2013.01); *C08K 9/04* (2013.01); *E04F 13/18* (2013.01)

(58) Field of Classification Search
CPC .... E04B 13/18; E04B 13/076; E04B 13/0801; E04B 13/0846; E04B 13/085; E04B 13/0887; E04B 13/0889; E04B 13/0891; E04B 13/0892; E04B 13/0894; E04B 13/0896; E04B 13/24; E04B 2/08; E04B 2/18; E04B 2/7425
See application file for complete search history.

(56) References Cited

U.S. PATENT DOCUMENTS

| | | | | |
|---|---|---|---|---|
| 2,412,693 | A * | 12/1946 | Pierson | B27D 1/10 156/304.3 |
| 3,468,086 | A * | 9/1969 | Warner | E04D 3/351 52/173.1 |
| 3,991,529 | A * | 11/1976 | Terwilliger | E04F 13/0885 52/100 |
| 4,075,805 | A * | 2/1978 | Bongiovanni | E04C 2/284 52/394 |
| 4,706,435 | A * | 11/1987 | Stewart | E04D 5/12 52/540 |
| 4,974,383 | A * | 12/1990 | Derr | E04C 2/292 52/404.4 |
| 5,427,643 | A * | 6/1995 | Aitken | B29C 66/14 156/304.6 |
| 5,540,022 | A * | 7/1996 | Morris | E04D 15/07 52/309.8 |
| 5,845,440 | A * | 12/1998 | Matsuyama | E06B 1/342 52/460 |
| 6,158,191 | A * | 12/2000 | Seem | E04D 1/2916 52/413 |
| 6,187,127 | B1 * | 2/2001 | Bolitsky | B27D 1/10 156/289 |
| 6,682,814 | B2 * | 1/2004 | Hendrickson | E04F 13/0864 428/326 |
| 6,857,243 | B2 * | 2/2005 | Bloomfield | E04C 2/043 156/92 |

(Continued)

*Primary Examiner* — Kyle J. Walraed-Sullivan
(74) *Attorney, Agent, or Firm* — Mark J. DiPietro; Fred C. Morgan

(57) ABSTRACT

An improved butt jointed siding system.

15 Claims, 3 Drawing Sheets

(56) References Cited

U.S. PATENT DOCUMENTS

| | | | | |
|---|---|---|---|---|
| 7,600,356 B2* | 10/2009 | Benjamin | E04F 13/0864 | 52/801.1 |
| 7,712,276 B2* | 5/2010 | Gilbert | B32B 13/12 | 52/529 |
| 7,836,652 B2* | 11/2010 | Futterman | E04F 13/02 | 52/459 |
| 9,073,285 B2* | 7/2015 | Chou | E04F 15/18 | |
| 9,127,460 B2* | 9/2015 | Barksdale | B32B 27/08 | |
| 9,290,952 B2* | 3/2016 | Buckwalter | E04F 15/02155 | |
| 9,499,981 B2* | 11/2016 | Grisolia | B32B 27/12 | |
| 10,267,039 B2* | 4/2019 | Bergman | E04B 9/067 | |
| 11,414,865 B2* | 8/2022 | Sealock | E04C 2/205 | |
| 2003/0046891 A1* | 3/2003 | Colada | E04F 13/0896 | 52/541 |
| 2003/0129348 A1* | 7/2003 | Peng | B32B 13/14 | 156/289 |
| 2004/0018354 A1* | 1/2004 | May | E04F 15/206 | 428/40.1 |
| 2004/0226247 A1* | 11/2004 | Byrd | E04D 3/358 | 52/518 |
| 2005/0252139 A1* | 11/2005 | Pringle | E04F 13/0864 | 52/521 |
| 2006/0096213 A1* | 5/2006 | Griffin | E04C 2/296 | 52/409 |
| 2007/0261353 A1* | 11/2007 | Cullen | E04F 13/0878 | 52/590.2 |
| 2007/0277464 A1* | 12/2007 | Takayasu | E04F 13/12 | 52/506.01 |
| 2008/0060289 A1* | 3/2008 | Shah | E06B 1/62 | 52/204.53 |
| 2009/0100780 A1* | 4/2009 | Mathis | E04C 2/296 | 52/794.1 |
| 2010/0059164 A1* | 3/2010 | Hughett | E04F 21/20 | 156/509 |
| 2010/0095629 A1* | 4/2010 | Taylor | E04B 2/08 | 52/570 |
| 2010/0132296 A1* | 6/2010 | Bootier | B29C 44/505 | 52/546 |
| 2010/0242398 A1* | 9/2010 | Cullen | E04F 13/0887 | 52/311.1 |
| 2011/0197528 A1* | 8/2011 | Egan | E04B 1/644 | 52/309.3 |
| 2012/0011795 A1* | 1/2012 | Pacione | A47G 27/0475 | 156/289 |
| 2013/0255174 A1* | 10/2013 | Stafford | E04F 15/02038 | 52/519 |
| 2014/0137496 A1* | 5/2014 | Fletcher | A47K 3/008 | 52/287.1 |
| 2016/0002916 A1* | 1/2016 | Grace | E04B 2/7457 | 52/745.1 |
| 2016/0201339 A1* | 7/2016 | Daley | C09J 7/20 | 156/60 |
| 2016/0312480 A1* | 10/2016 | Zinssler | F16L 5/10 | |
| 2017/0144354 A1* | 5/2017 | Lombaert | B32B 27/12 | |
| 2017/0314275 A1* | 11/2017 | Rosenthal | E04F 13/077 | |
| 2018/0334810 A1* | 11/2018 | Magnusson | E04F 13/0894 | |
| 2020/0048913 A1* | 2/2020 | Heikkila | E04F 13/0896 | |
| 2020/0131783 A1* | 4/2020 | Liu | B32B 27/18 | |
| 2020/0199886 A1* | 6/2020 | Van Giel | B32B 23/20 | |
| 2021/0131122 A1* | 5/2021 | Magnusson | B32B 3/30 | |
| 2021/0230884 A1* | 7/2021 | Wise | E04F 15/187 | |
| 2021/0381250 A1* | 12/2021 | Fults | E04F 13/04 | |
| 2022/0048276 A1* | 2/2022 | Magnusson | B32B 3/30 | |
| 2022/0307269 A1* | 9/2022 | Kuelker | E04F 13/007 | |

* cited by examiner

SLIDING JOINERY

CROSS-REFERENCE TO RELATED APPLICATIONS

This application claims the benefit of a U.S. Patent Provisional Application Ser. No. 63/022,102, filed May 8, 2020. This application is hereby incorporated by reference in its entirety.

FIELD OF THE INVENTION

The disclosure relates to an improved siding system. The installation of the system results in an improved siding with improved appearance, thermal properties, and environmental stability.

BACKGROUND OF THE INVENTION

The claimed subject matter relates to an improved siding system. The siding can be used on commercial, industrial, and residential construction. The system provides for an easily installed attractive exterior appearance. The installed system has an improved appearance and improved thermal stability to environmental conditions. Many materials have been conventional used as exterior finishes on residential, commercial, and industrial structure. Initially brick, stucco, wood, and vinyl are popular choices. This conventional siding option while being useful and at least minimally attractive, pose substantial challenges to cost of installation, environmental stability, weathering, and required maintenance.

More specifically, the use of vinyl siding in the form of extruded vinyl siding members and extruded polymer fiber composite members have also become a focus of interest. In any installation of conventional vinyl siding, a starter course is installed on a surface. Such vinyl siding numbers are sold in discrete lengths and after the installation of the first member in the first course, the second siding member is installed in an overlapping fashion such that typically greater than an eighth of an inch or more overlap exists between the initial member and adjacent members. This overlapping installation mode is currently the only commercially available method of installing siding. While the initial installation of such an overlapping siding structure is minimally acceptable to both the installer companies and the property owners, even when initially installed, the overlapping areas are typically visible even with minimally close inspection. The overlapping installation mode suffers from several cosmetic and performance drawbacks. First, in response to environmental conditions including temperature change, direct solar energy, cold, precipitation in the form of rain and snow contacting the siding and other factors, the vinyl materials can often become distorted. Such distortion is highly undesirable from all cosmetic and practical viewpoints. Conventional siding systems are not currently installed with "butt joints" due to the extensive COTE that would expose the rough sheathing that underlies the siding as the butt joint expands and contracts under thermal stress.

The "fish mouth" problem is an unsightly problem in vinyl siding (see FIG. 9). Fish mouth refers to a visible gap between siding members at the overlap. Additionally, the fish mouth can cause substantial problems to the structure because the opening can increase the likelihood that rain and snow precipitation can penetrate the siding layer thus failing the primary purpose of siding which is the environmental integrity of the structure. Further the fish mouth opening provides a substantial likelihood that a strong wind force acting against the fish mouth opening can pull siding members from the rough surface thus completely defeating the siding installation.

BRIEF DESCRIPTION OF THE INVENTION

An environmentally stable siding system comprises a siding member comprising a thermoplastic polymer and a reinforcing fiber. A glass fiber is one option for a fiber material. The siding can have a composite having a COTE less than $2 \times 10^{-5}$ in/in/° F.; and adhered to the siding member a tape comprising a tape film and a PSA adhesive. The tape has a portion of the tape adhered to the siding and the unadhered balance having an adhesive layer covered by a release liner.

The pressure-sensitive adhesive tape used in connecting a first siding member to a second siding member to ensure the stability of a butt joint, typically comprises, at a minimum, a polymeric film, and a pressure-sensitive adhesive coating on at least one side of the tape. The tape can comprise additional reinforcing components, thermally insulating components, or any other material that can aid in the necessary properties of a siding installation if the overall thickness of the tape does not interfere with the smooth installation and cosmetic appearance of the installed siding materials.

The polymeric tape has a film layer, typically made of a thermoplastic polymer material. The polymer material must have sufficient tensile strength and resiliency such that the stresses it experiences during movement of the siding due to temperature extremes does not overstrain the tape. The tape must maintain its structural integrity and not fail under stress. Such a property requires a tensile modulus of 0.5-3 or 0.8-3 GPa and resiliency. The term "resiliency" indicates that if the tape is placed under stress conditions in extreme temperature ranges that if the tape does yield somewhat, that it tends to restore its length to the original dimension. In other words, it acts as a "rubber band" as the stress is at least released somewhat. Again, the tensile modulus ensures that the tape does not fail, either by breaking or distorting under the stresses experienced from movement of siding during temperature extremes.

The pressure-sensitive adhesive of the tape system must have sufficient peel and shear strength, such that the adhesive has sufficient cohesive strength and adhesive strength, such that the adhesive does not fail during temperature extremes. The term cohesive means the tendency of the adhesive material to adhere to itself. Typically shear and peel strength of the adhesive relate to the bond strength of the adhesive to the substrate siding member. With adequate peel strength and a sufficient shear strength, the adhesive will not fail due to cohesive failure and the adhesive bond to the substrate siding member will not adhesively fail under the weather conditions and the extreme temperatures that could be endured.

The tape has a tensile strength greater than about 0.8 psi. The adhesive bonding construction is such that any foam layer in the construction is greater than or equal to at least three times the adhesive layer thickness. The adhesive layer having a peel strength of greater than about 5-25 lb./lineal in (ASTM 1876) and comprising at least 10 wt. % of a polymer with a $T_g$ less than $-10°$ C. The composite comprises greater than 5 vol. % glass fiber and less than 95 vol. % polymer.

The installed siding members installed on a vertical rough construction surface comprising at least a first siding member and a second siding member in butt joint relationship.

Adhered to the reverse side of each siding member and spanning the butt joint, a tape is installed having an adhesive layer between the tape film and the siding members. The tape has a polymer memory (will return to original dimension after stress); the adhesive has a peel strength of greater than 5 lb./lineal inch and comprising at least a 10 wt. % of a polymer with a Tg less than −10° C. The composite comprises greater than about 5 vol. % glass fiber and less than about 95 vol. % of polymer.

In response to this substantial need and the problems in existing technology, a new system is required that will provide an installed siding with a butt joint and without overlap that improves the security of the system from rain and snow penetration and prevents "fish mouth".

We have found a selected set of both siding and adhesive tape materials with very specific physical and thermal properties can obtain a siding installation with a stable butt joint. A stable butt joint provides substantially improved cosmetics and which will prevent fish mouth but still allow the siding system to controllably expand and contract over the lifetime of an installation. We have further found that a careful selection of the nature of the glass fiber polymer composite when combined with a specific selection of an adhesive tape can be used in siding installation structures and methods. We have found that the overlapping mode of siding installation can be avoided by switching to a "butt joint" type of installation. The siding members are installed such that the finished ends are in a butt joint relationship maintaining essentially no gap between the adjacent siding members. The system maintains that secure butt joint even in extreme environmental conditions. Since the conventional siding members cannot be installed in such a format due to problems with fish mouthing and precipitation penetration, we have found that a careful selection of an adhesive tape spanning the butt joint of a specific proportion and dimension can stabilize the butt joint such that it does not separate but maintains a smooth and clean appearance over the lifetime of the siding installation.

Not every tape and siding combination will be enough to obtain an effective siding structure. First a siding composite having acceptable or minimized COTE must be selected. Secondly the adhesive tape comprising a film layer and a pressure sensitive adhesive layer of specific properties must be used. The tape film must have a tensile strength, elastic toughness, and resiliency great enough to accommodate the expansion of any gap between the butt joint ends and function in extreme ambient temperatures (−30° F. to 120° F.—and higher siding temperatures) or more in harsh environments. The tape film must also have polymer memory such that if any substantial gap does form, the film can "pull" the siding ends together until they are either in contact or are within less than 0.5 millimeters. Further the pressure sensitive adhesive on the tape must have substantial bond strength such that any force is placed on the adhesive layer does not cause any movement of the tape with respect to the siding member.

There can be no doubt that there is a vast array of vinyl sidings and vinyl composite sidings available to the industry today. Further there are a vast array of pressure sensitive adhesive tapes available to the industry today. A simple random selection of a vinyl material and an available tape will fail to provide the performance necessary in adhesive, elastic, memory, and environmental properties. Only a very careful selection of a low COTE vinyl composite with a specific adhesive tape having the required characteristics of elasticity and polymer memory in the adhesive as well as being reinforced with glass fibers in some embodiments can result in not only a financially successful installation but also to an installation that will survive 20 plus years, or the siding lifetime as established by the siding manufacturer.

The reason the conventional PVC siding members are installed with a substantial overlap relates to the COTE of greater than $2\times10^{-5}$ in/in/° F. of conventional siding and the associate thermal instability (expansion and contraction). As siding members expand, in response to heat stress, they move mostly longitudinally. For example, environmental or radiant heat generated by the sun drives heat expansion. Taped butt joints cannot work in convention al PVC siding for the period of use. The adhesive will fail to maintain a tight joint for a variety of reasons and commercial manufacturers have not attempted to introduce such a system. Siding with a low COTE has not been implemented. Using the taping system of the disclosure, a useful and functional installation with PVC or the like polymers can be realized. No successful low COTE (less than $2\times10^{-5}$ in/in/° F., or less than $5\times10^{-5}$ in/in/° F.) can be made available to the market.

In a first embodiment is a layered tape that can be used to secure adjacent siding units.

In one embodiment is a single siding member.

In another embodiment an installed siding system comprises two or more siding members.

In still another embodiment is shown an installation method of obtaining a finished dimensionally and environmentally stable butt jointed siding installation.

The above summary of the disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

The term "siding profile" means an extruded member with an appearance that mimics or resembles a common conventional siding look and feel. Included in such profiles are structures that can have grained or un-grained appearances, painted and stained clapboards, painted and stained shingle siding, slate siding, brick or other ceramic siding and others that can be embossed or thermoformed into the thermoplastic.

The term "reverse face" means the face of the siding that faces the rough building exterior.

The term "exterior face" means the face opposite the reverse face that is exposed to the environment and can be seen or is viewable.

The term "top edge" means a substantially linear edge extending along the top of the siding substantially parallel to the ground. The term "bottom edge" means a substantially linear edge extending along the bottom of the siding substantially parallel to the ground.

The term "nailing flange" is a strip with apertures for fasteners that is integral to an edge or added onto the profile. Such a flange is typically added to the top edge.

The term "installation surface" means a substantially planar surface that is sized and configured to match the substantially planar rough exterior of a building.

The term "installation locus" means a surface of a construction that can support overlapping additional siding installed thereon.

The term "clapboard profile" means the appearance of a conventional installed clapboard siding application with one, two or three courses of clapboards in a polymer siding member, The term "thermally stable" indicates that the thermoplastic materials that make up the siding do not change under the influence of heat such that the profile departs from its color, original profile shape or form gaps between overlapping siding panels.

The term "memory", "polymer memory" or "elasticity" refers to a property of the adhesive to return to its installation dimensions or confirmation after a stress of expansion has been applied from the environment such as heat. As an example, the joint, "butt joint", between the two siding members pull apart or separates beyond 0.5 mm. The memory or elasticity in the polymer comprising the adhesive will tend to pull the joint back into position of 0.5 mm or less after the heat stress is removed.

The term "mechanical stability" refers to the ability of the installed panel to substantially reduce the impact of forceful objects on the panel that could otherwise cause cosmetic and structural damage.

The term "interfacial modifier" (IM) means a material that can coat the surface of fiber and does not react or interact with the polymer or other coated fiber present in the composite.

The term "butt joint" means a joint where the ends of a first siding member and a second siding member are adjacent to each other. The adjacent ends are either in contact with each other or separated by no more than 0.5 mm.

The term "fish mouth" means an opening formed as a hoop or arch at the end of the siding member wherein a visible separation or opening is seen (FIG. 7) between adjacent installed siding units. The hoop or arch can be a 0.25" or greater as an opening on the side member end.

BRIEF DESCRIPTION OF THE FIGURES

The disclosure may be more completely understood in consideration of the following detailed description of various embodiments of the disclosure in connection with the accompanying drawings, in which.

The figures are not necessarily to scale. Like numbers used in the figures refer to like components. However, it will be understood that the use of a number to refer to a component figure is not intended to limit the component in another figure labeled with the same number.

DETAILED DESCRIPTION

Figure 1:
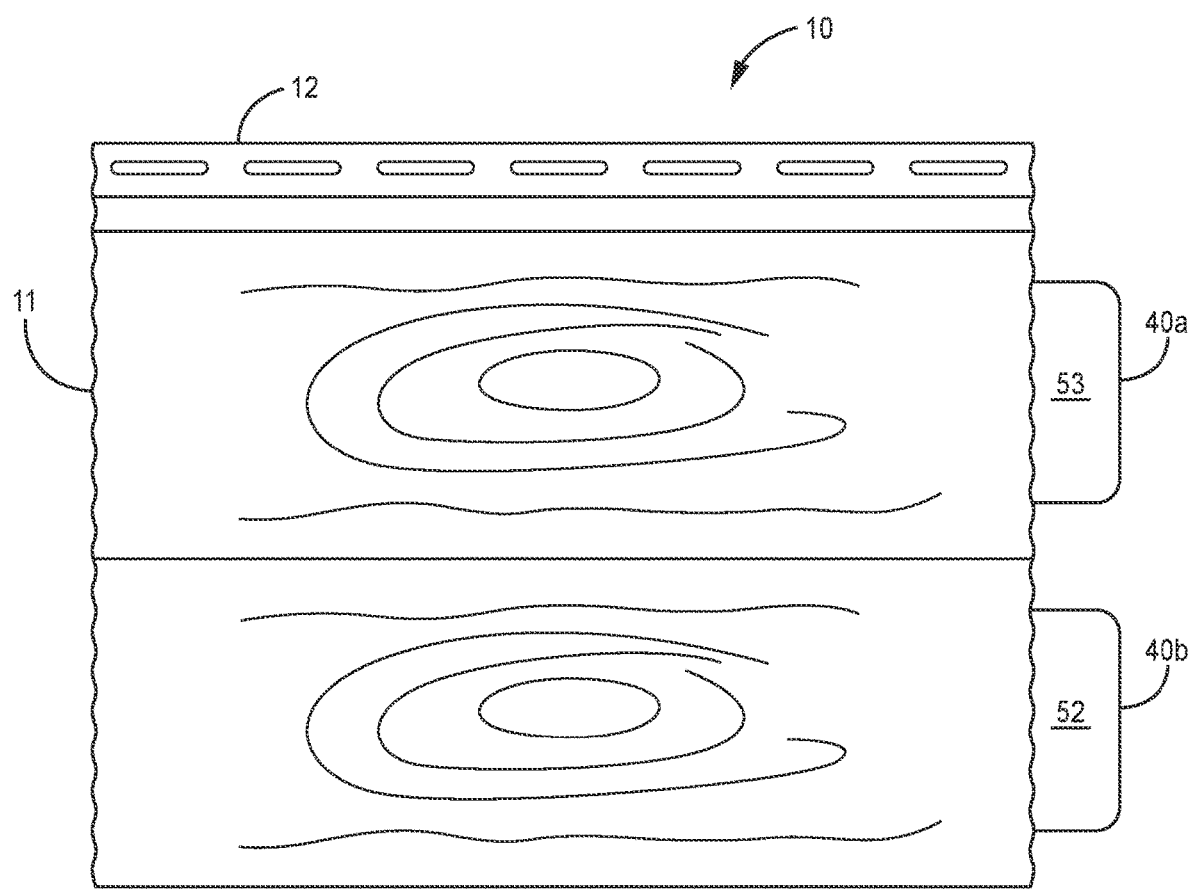
FIG. 1 is a plan view of a double "clapboard" siding unit.

In a general sense, the disclosure relates to a siding that can be installed in a stable and attractive butt joint relationship. The installation is obtained by forming a butt joint between adjacent members with the joint stabilized by an adhesive tape. The combination of a low COTE siding composite and a selection of a PSA adhesive tape with selected properties (including at least tensile modulus and adhesive lap shear) can make and maintain a successful butt joint in a system with a low COTE siding member.

A pressure sensitive adhesive tape also known as a self-stick adhesive tape is an important category of the thin flexible tapes with a coating of adhesive. The pressure sensitive adhesive tape of the claimed materials is an adhesive tape having a coating of an adhesive on a thin sheet or film. A useful adhesive is a pressure sensitive adhesive with specific peel strength, elastic and cohesiveness that cooperate with the film or sheet in preventing or reducing a gap formed at a butt joint between two siding members. A pressure sensitive adhesive is an adhesive that has permanent tack and will adhere to a surface once contact with a substrate is made with enough pressure to intimately contact the tape adhesive layer with the substrate. Adhesive tapes are made from a thin material typically called a plastic backing or plastic carrier or plastic foil which is coated with the adhesive. The film or foil layer is typically thin and can range from about 0.1 to 4 mm (6 to 120 mils) thickness and can be 0.5 cm to 1 meter in width. The length of the film or foil is typically indeterminate. The term indeterminate means that the film is sufficiently long such that it can easily be stored on a roll form with many meters of tape. Both the pressure sensitive adhesive tape and the release liner can be stored on rolls and can have a maximum length greater than 5,000 meters depending on the role size. However more commonly the maximum length of the tape can be anywhere from 50 to 2,000 meters.

The amount of adhesive is limited only by the diameter of the roll as it is made. The adhesive tape portion of the claim material must have a width and length that conforms to the siding product to which it is attached. The sidings are rarely more than three feet in width. Accordingly, a tape portion typically must be less than about 5 centimeters to 2.5 centimeters. The length of the tape portion must be enough such that as the tape portion is positioned over the butt joint joining the first member to the second member. Enough the tape is bonded to each member such that the tape is enough shear such that the tape does not yield in a shear mode. To retain removable pressure-sensitive properties, it is necessary to limit the relative amount of permanent pressure-sensitive adhesive employed. For a typical total pressure-sensitive adhesive add on weight of 10-100 g-m$^{-2}$ or about of 20-50 g-m$^{-2}$ with a layer thickness of about 5-50 μm or 6-40 μm of adhesive. The area of the adhesive surface in contact with the siding member is 3.5 to 35 cm$^2$.

Pressure sensitive adhesives are typically made by combining a polymer with a tackifier and can include additional components such as an extending or plasticizing oil, stabilizers, dyes, and other typical adhesive additives. The selection of the correct adhesive is one that has enough bond strength to the substrate such that the tape does not move relative to the substrate under a shear mode when subject to forces of a thermal change in the siding system environment.

Adhesives can be used in the tapes as claimed included acrylic adhesives, rubber-based adhesives, silicone adhesives, thermoplastic urethane and crosslinked silicone adhesives and others. Films that can be used in the tapes of the claimed materials include cloth backings, high strength foam backings, metal foils, plastic films or polymers, fiberglass mats and others. Specifically, desirable film polymers include polyesters, polyvinyl chloride, polyacrylic and thermoplastic polyurethanes. A desirable film can comprise a composite of a polymer and a fiber such as glass, Kevlar, wood, or other reinforcement.

Pressure sensitive adhesives are typically made by coating the carrier or film in a continuous manner with a roll coater such that a thin layer of the adhesive is applied to the carrier or film leaving the pressure sensitive layer on the film. In making the adhesive tapes of the claimed materials, the film or carrier is coated and then protective with what is called a release liner.

Release liners can be made from a variety of materials each of which provides a flexible release liner for its typical application. High quality adhesive release liners can be made from paper, coated paper, polymer film, polyester film and often have a low surface energy silicone material coating having no tack and no substantial adhesion to the adhesive. The liner promotes easy removal from the pressure sensitive adhesive. Useful release liners can be made from common craft paper, typical polyethylene terephthalate polymers, polypropylene polymers, etc. The release coating on the liner can be a silicone, a fluoro-silicone, a fluoropolymer, or cross link silicone materials. Typical release liners are less than 0.2 millimeters and can range from 0.1 to 0.5 millimeters in thickness. The release liner width is set to be substantially identical to that of the pressure sensitive adhesive to which it is applied.

In use the selected portion of the tape is severed from its roll or supply and a portion of the release liner is removed from the tape. The exposed adhesive is then applied with enough pressure to obtain a shear resistant bond to the siding member. This construction is then brought into butt joint contact with a second siding member and any release liner is removed. The remaining exposed adhesive is then contacted with the second siding member in a butt joint under enough pressure to again develop enough shear strength for a stable construction. Typical application pressure for the binding of the adhesive to the siding substrate is typically greater than 15 lb.-in$^{-2}$. Application temperatures are typically more than ambient temperatures 20-30° C. (about 70-80° F.) and since the adhesive tends to be a heat resistant adhesive, the temperature of the adhesive can be as warm as 50 to 100° C. for obtaining the best shear resistant bond strength. Release liners are typically thin film like or sheet like materials that are applied to a pressure sensitive adhesive to prevent the adhesive being contaminated prior to use and to prevent the tape adhering to substrates at an unwanted location.

A siding panel assembly comprises a continuous composite siding profile and an optional reinforcing insulation member. The profile comprising a top edge comprising a nailing flange and a bottom edge, an exterior face, and a reverse face, and a right and a left installation locus for adjacent panels. The reinforcing insulation substantially covers the reverse face of the siding panel.

A reinforcing insulation member fitting the reverse side of the siding profile such as a clapboard profile or overlapping beveled profile siding members provides a substantially planar installation surface on the reverse portion of the panel assembly.

The siding, because of the advanced IM coated glass fiber composite, has improved thermal and mechanical stability. Mechanical stability is reflected in impact properties as measured by ASTM D256 and the tensile and flexural properties as measured by ASTM D638 and D790. Thermal stability is reflected in its heat deflection temperature of at least 60° C. (ASTM D648), and a COTE less than $2\times10^{-5}$ in/in/° F. or $5\times10^{-5}$ in/in/° F. or $1\times10^{-6}$ or $6\times10^{-6}$ in/in/° F. (ASTM 696).

Composites of the embodiments are made by combining an interfacially modified or coated fiber with a thermoplastic polymer. The composite material is made from chopped fiber or a collection of substantially parallel fibers such as a yarn or tow. Chopped fiber is commercially available. Chopped materials are made by first extruding fiber and chopping the fiber into lengths as needed. One useful fiber comprises glass. Glass or silicate glass uses silica (silicon dioxide) to form the amorphous gassy material. Soda-lime glass, containing around 70% silica, accounts for around 90% of manufactured glass. The term glass, popularly, refers to the conventional type of material. Typical glass contains formers, fluxes, and stabilizers. A former is commonly silica (Silicon dioxide) in the form of sand although other glasses are known. Fluxes lower the fusion/melt temperature of the blended ingredients. Sodium carbonate and potassium carbonate are common alkali fluxes. Potash glass is slightly denser than soda glass. Stabilizers make the glass strong and water resistant. Calcium carbonate, often called calcined limestone, is a stabilizer. Without a stabilizer, water and humidity attack and dissolve glass.

A glass yarn or tow is collection of substantially continuous, unentangled, parallel, structural fibers, each oriented in substantially parallel direction. The fiber is derived from a plurality of threads, one or more yarns or one or more tows as those terms are understood in the industry. A plurality of individual fibers is sorted, uniformly spread, and then dispersed into a polymer. The fibers can be directed through an extruder head and is combined with polymer in the melt phase to form a layer of fiber coated by or dispersed in polymer.

The chopped or continuous fiber, yarn, or tow reinforcing material of the claimed composite can comprise any inorganic or organic yarn, fiber, or tow that exhibits substantial tensile strength in the fiber and substantial physical properties in the composite even at elevated temperatures. Such yarns, or tows are substantially multi-filament assemblies of fibers having 500 or more fibers and can have up to 20,000 fibers. Such yarns or fibers are typically produced by heating precursor material into a melt and then spinning the fibers through small diameter orifices. The spun fibers can then be taken up with spools, bobbins, reels, or other form that can contain a large indeterminate length or quantity of the manufactured fiber. Once formed the fiber can be chopped to a desired size(s).

The specific choice of the fiber is governed by the environment of the intended use. In applications strength, stiffness, impact strength, and toughness can be engineered for each individual use. Different structural requirements which can be engineered as needed. The properties can be obtained by varying the fiber content, fiber diameter, composite, and dimensions and polymer or thermoplastic content. Further, the type of fiber can have a significant impact on the ultimate physical properties of the composite.

Useful fibers include natural and synthetic fibers. Natural fibers include cellulosics, such as wood fibers and cotton and proteins such as wool or silk. Synthetic fibers include inorganic and organic materials. Inorganics include ceramics, carbon, metals, and glass fibers. Organic fibers are typically polymeric materials such as acrylics, polyester, nylon, polyolefin etc.

The coated glass fiber is particularly useful in manufacturing the composites in the invention are compatible with the thermoplastic material in the sense that they are chemically inert and have surface characteristics that do not prevent wet out of the polymer onto the IM coated glass surface. Further, the fiber material should have a coefficient of thermal expansion (COTE) that is not substantially dissimilar from the polymer matrix.

In making the composite as claimed, the reinforcing fiber typically dispersed within a thermoplastic matrix at proportions set to obtain the desired structural and thermal properties in the composite as required by the end use of the composite material. See tables 1-4 below for materials proportions.

The composite materials, in a final structural article can obtain thermal and mechanical stability, including improved coefficient of thermal expansion (COTE), and resistance to deformation and impact resistance, stiffness, and tensile and flexural stability. This gives the ability to adapt the composite to the specific structural characteristics of the final product installed on a surface containing multiple parts made from the composite. Such parts can be combined using a variety of mechanical, adhesive, and thermal construction techniques. The composites of the claimed materials begin with processing a plurality of the fiber from a tow or yarn, preparing the fiber tow or yarn in an arrangement of the fibers in a longitudinal substantially planar array, combining the substantially longitudinal planar and parallel array with a thermoplastic material to form a substantially uniform web of parallel fibers dispersed in a polymer matrix.

Typically, the composite materials of the invention are manufactured using melt processing. A typical thermoplastic polymer material is combined with fiber and processed until the material attains substantial uniformity. In the claimed materials, the fibers are coated or treated with IM before melt processing with polymer to obtain the ease of processing and physical properties needed. Once coated, the fiber exterior appears to the polymer to be the IM composition while the fiber silica character is hidden. The organic nature of the coating changes the nature of the interaction between the fiber surface and the polymer phase.

The silicate surfaces of the fibers are of a different surface energy and hydrophobicity than the polymer or coating. The polymer does not easily associate with the inorganic fiber surface, but much more easily associates with the organic nature of the coated surface of the inorganic fiber. The coated fiber mixes well with the polymer and can achieve greater composite uniformity and fiber loadings.

Typically, a pellet is extruded and is then melt formed into sheet form. The composite sheet, thus, obtains improved physical properties such as notched IZOD impact strength in (ft-lb-in$^{-1}$) (ASTM D256), tensile strength (lb-in$^2$), modulus (lb.×10$^6$-in$^{-2}$) and elongation (%) (ASTM D638/D3039) flexural strength (lb-in$^r$) and modulus (lb.×10$^6$-in$^{-2}$) at elevated temperature (ASTM 790), and coefficient of thermal expansion (in-in$^{-1}$-° F.) (COTE—ASTM 696). Such properties are seen over a range of environmental temperatures.

TABLE 1

Typical properties Tape or film

| Property | ASTM Method | | | Units |
|---|---|---|---|---|
| Tensile Strength | D638 | 10-100 | 15-75 | MPa |
| Tensile Modulus | D638 | 0.5-5 | 0.8-3 | GPA |

TABLE 2

Typical properties Adhesive (PSA)

| Property | ASTM Method | | | Units |
|---|---|---|---|---|
| Peel | D903 | 5-25 | 10-20 | lb./lineal inch |
| Shear | D903 | 100-500 | 200-400 | psi |

The composite used to make the siding member is more than a simple admixture. A composite is defined as a combination of two or more substances at various percentages, in which each component results in properties that are in addition to or superior to those of its constituents. In a simple admixture the mixed material has little interaction and little property enhancement. At least one of the materials in the composite is chosen to increase stiffness, strength, or density. The atoms and molecules in the components of the admixture can form bonds with other atoms or molecules using several mechanisms. Such bonding can occur between the electron cloud of an atom or molecular surfaces including molecular-molecular interactions, atom-molecular interactions, and atom-atom interactions. Each bonding mechanism involves characteristic forces and dimensions between the atomic centers even in molecular interactions.

An interfacial modifier (IM) is an organo-metallic material that provides an exterior coating on the fiber promoting the close particle to particle association, packing and friction reduction. No particle to particle or particle to polymer attachment or reactive bonding is formed between polymer or other particles. The composite properties arise from the intimate association of the polymer and fiber obtained by use of careful processing and manufacture.

The lack of reactive bonding between the components of the composite leads to the formation of the novel composite—such as high packing fraction, commercially useful rheology, viscoelastic properties, and surface inertness of the fiber. These characteristics can be readily observed when the composite with interfacially modified coated fiber is compared to fiber lacking the interfacial modifier coating.

In one embodiment, the coating of interfacial modifier at least partially covers the surface of the fiber. In another embodiment, the coating of interfacial modifier continuously and uniformly covers the surface of the fiber, in a continuous coating phase layer. Minimal amounts of the modifier can be used including about 0.005 to 8 wt.-%, about 0.02 to 6.0, wt. %, about 0.02 to 3.0 wt. %, about 0.02 to 4.0 wt. % or about 0.02 to 5.0 wt. %, the percentages based on the weigh to the coated particulate of fiber. The IM coating can be formed as a coating of at least 3 molecular layers or at least about 50 or about 100 to 500 or about 100 to 1000 angstroms (Å). The claimed composites with increased loadings of fiber can be safely compounded and melt processed into the high strength siding members.

Interfacial modifiers used in the application fall into broad categories including, for example, titanate compounds, zirconate compounds, hafnium compounds, samarium compounds, strontium compounds, neodymium compounds, yttrium compounds, phosphonate compounds, aluminate compounds and zinc compounds. Aluminates, phosphonates, titanate, and zirconate that are useful contain from about 1 to about 3 ligands comprising hydrocarbyl phosphate esters and/or hydrocarbyl sulfonate esters and about 1 to 3 hydrocarbyl ligands which may further contain unsaturation and heteroatoms such as oxygen, nitrogen, and sulfur. In embodiments the titanate and zirconate contain from about 2 to about 3 ligands comprising hydrocarbyl phosphate esters and/or hydrocarbyl sulfonate esters, preferably 3 of such ligands and about 1 to 2 hydrocarbyl ligands, preferably 1 hydrocarbyl ligand. Mixtures of the organo-metallic materials may be used.

The interfacial modification technology depends on the ability to isolate the particles or fibers from the continuous polymer phase. The isolation is obtained from a continuous molecular layer(s) of interfacial modifier to be distributed over the surface. Once this layer is applied, the behavior at the interface of the interfacial modifier to polymer dominates and defines the physical properties of the composite and the shaped or structural article (e.g., modulus, tensile, rheology, packing fraction and elongation behavior) while the bulk nature of the fiber dominates the bulk material characteristics of the composite (e.g., density, thermal conductivity, compressive strength). The correlation of fiber bulk properties to that of the final composite is especially strong due to the high-volume percentage loadings of discontinuous phase, such as fiber, associated with the technology.

Sizing or other coating materials used as glass coatings do not act as interfacial modifiers. Sizings can be lubricants, protective, or reactive couplers but do not contribute to the properties of a composite using an interfacial modifier coating on the fiber surface. Sizing is an essential processing component in glass fiber manufacture. Sizing is critical to certain glass fiber characteristics determining how fibers will be handled during manufacturing and use. Raw fibers are abrasive and easily abraded and reduced in size. Without sizing, fibers can be reduced to useless "fuzz" during processing. Sizing formulations have been used by manufacturers to distinguish their glass products from competitors' glass products. Glass fiber sizing, typically, is a mixture of several chemistries each contributing to sizing performance on the glass fiber surface. Sizings typically are manufactured from film forming compositions and reactive coupling agents. Once formed, the combination of a film forming material and a reactive coupler forms a reactively coupled film that is, reactively coupled to the glass fiber surface. The sizing protects the fiber, holding fibers together prior to molding but promote dispersion of the fiber when contacting polymer or resin insuring wet out of glass fiber with resin during composite manufacture. Typically, the coupling agent used with the film forming agent, is a reactive alkoxy silane compound serving primarily to bond the glass fiber to their matrix or film forming resin. Silane typically have a silicon containing group and that bonds well to glass (typically $SiO_2$) with a reactive organic end that bonds well to film forming polymer resins. Sizings also may contain additional lubricating agents as well as anti-static agents. We have used sized fibers in our studies and found that sizing does not act as interfacial modifier or interfere with the IM and we can coat all sizing materials that we have found with an IM with no loss of performance of the composite.

Useful fiber includes both natural and synthetic fibers. Natural fiber includes those of animal or plant origin. Plant based examples include cellulosic materials such as wood fiber, cotton, flax, jute, cellulose acetate etc.; animal-based materials made of protein include wool, silk etc. Synthetic fibers include polymer materials such as acrylic, aramid, amide-imide, nylon, polyolefin, polyester, polyurethane, carbon, etc. Other types include glass, metal, or ceramic fibers. Metallic fibers are manufactured fibers of metal, metal coated plastic or a core completely covered by metal. Non-limiting examples of such metal fibers include gold, silver, aluminum, stainless steel, and copper. The metal fibers may be used alone or in combinations. The determinant for the selection metal fiber is dependent on the properties desired in the composite material or the shaped article made therefrom. One useful fiber comprises a glass fiber known by the designations: A, C, D, E, Zero Boron E, ECR, AR, R, S, S-2, N, and the like. Generally, any glass that can be made into fibers either by drawing processes used for making reinforcement fibers or spinning processes used for making thermal insulation fibers. Such fiber is typically used as a length of about 0.8-100 mm often about 2-100 mm, a diameter about 0.8-100 microns and an aspect ratio (length divided by diameter) greater than 90 or about 100 to 1500.

These commercially available fibers are often combined with a sizing coating. Such coatings cause the otherwise ionically neutral glass fibers to form and remain in bundles or fiber aggregates. Sizing coatings are applied during manufacture before gathering. Sizings can be lubricants, protective, or reactive couplers but do not contribute to the properties of a composite using an interfacial modifier coating on the fiber surface.

A large variety of polymer and copolymer materials, such as thermoplastic or thermoset polymers, can be used in the composite materials used in the siding member. In some components, such a nailing flange or support materials, a polymer can be used without fiber or particulate. We have found that polymer materials useful in the composite include both condensation polymeric materials and addition or vinyl polymeric materials. Vinyl polymers are typically manufactured by the polymerization of monomers having an ethylenically unsaturated olefinic group.

The typical polymer has a density of at least 0.85 gm-$cm^{-3}$, however, polymers having a density of greater than 0.96 are useful to enhance overall product density. A polymer density is often up to 1.7 or up to 2 gm-$cm^{-3}$ or can be about 1.5 to 1.95 gm-$cm^{-3}$.

Thermoplastic Polymer

A large variety of thermoplastic polymer and copolymer materials can be used in the composite materials. We have found that polymer materials useful in the composite include both condensation polymeric materials and addition or vinyl polymeric materials.

Vinyl polymers are typically manufactured by the polymerization of monomers having an ethylenically unsaturated olefinic group. Condensation polymers are typically prepared by a condensation polymerization reaction which is typically considered to be a stepwise chemical reaction in which two or more molecules combined, often but not necessarily accompanied by the separation of water, methanol, or some other simple, typically volatile substance. Such polymers can be formed in a process called polycondensation. The typical polymer has a density of at least 0.85 gm-$cm^{-3}$, however, polymers having a density of greater than 0.96 are useful to enhance overall product density. A density is often 0.94 to 1.7 or up to 2 gm-$cm^{-3}$ or can be about 0.96 to 1.95 gm-$cm^{-3}$.

Useful vinyl polymers include polyacrylonitrile; polymer of alpha-olefins such as ethylene, propylene, etc.; polymers of chlorinated monomers such as vinyl chloride, vinylidene chloride, acrylate monomers such as acrylic acid, methyl acrylate, methyl methacrylate, acrylamide, hydroxyethyl acrylate, and others; styrenic monomers such as styrene, alpha-methyl styrene, vinyl toluene, etc.; vinyl acetate; and other commonly available ethylenically unsaturated monomer compositions. Examples include polyethylene, polypropylene, polybutylene, acrylonitrile-butadiene-styrene (ABS), polybutylene copolymers, polyacetal resins, polyacrylic resins, homopolymers, etc. Useful polymers are halogen polymers such as homopolymers, copolymers, and blends comprising vinyl chloride, vinylidene chloride, fluorocarbon monomers, etc. Polyvinyl chloride polymers with a K value of 50-75 can be used. A characteristic of the PVC resin is the length or size of the polymer molecules. A measure of the length or size is molecular weight of PVC. A useful molecular weight can be based on measurements of viscosity of a PVC solution. Such a K value ranges usually between 35 and 80. Low K-values imply low molecular weight (which is easy to process but has properties consistent with lower polymer size) and high K-values imply high molecular weight, (which is difficult to process, but has properties consistent with polymer size). The most employed molecular characterization of PVC is to measure the one-point-solution viscosity. Expressed either as inherent viscosity (IV) or K-value, this measurement is used to select resins for the use in extrusion, molding, as well as for sheets, films, or other applications. The inherent viscosity (IV) or K-value is the industry standard (ISO 1628-2) starting point for designing compounds for end use. Polymer solution viscosity is the most common measurement for further calculation of inherent viscosity or the K-value because it is an inexpensive and routine procedure that can be used in manufacturing as well as in R&D labs. For example, a Lovis® 2000 M/ME micro-viscometer can measure polymer solution viscosity and set K value.

The primary requirement for the substantially thermoplastic polymer material is that it retains sufficient thermoplastic properties such as viscosity and stability, to permit melt blending with a fiber, permit formation of linear extrudate pellets when needed, and to permit the composition material or pellet to be extruded or injection molded in a conventional thermoplastic process forming the useful product. Engineering polymer and polymer alloys are available from several manufacturers including Dyneon LLC, B.F. Goodrich, G.E., Dow, and duPont.

Aspects of the claimed siding include a method of installing a siding system the method comprising removing a release liner from a siding member adhesive tape portion wherein a portion of the tape is adherent to the reverse side of the siding member and removing the tape exposes the adhesive surface; attaching the siding member to the rough surface of a rough vertical surface of a construction and installing a second siding member in butt joint relationship with the first member wherein the adhesive tape exposed from the first siding member adhesively adheres to the second siding member maintaining the members and butt joint relationship over the lifetime of the installation.

DETAILED DESCRIPTION OF THE FIGURES

FIG. 1 shows a plan view of one aspect of the siding unit as disclosed. The siding unit 10, has the appearance of a double clapboard installation in a single extruded polymeric number. Figure one shows the siding unit 10 comprising the siding member 11. Arranged along the upper surface of the unit 10 is a nailing flange 12. Installed at one end of the siding unit are two tape members of the invention, tape member 40a and tape member 40b having exposed a portion of the tape member to view, while a portion of the tape member 40a and 40b is not shown and hidden behind siding member 11. Tape member 40a and 40b each have an optional release liner installed on the adhesive surface not shown.

Figure 2:
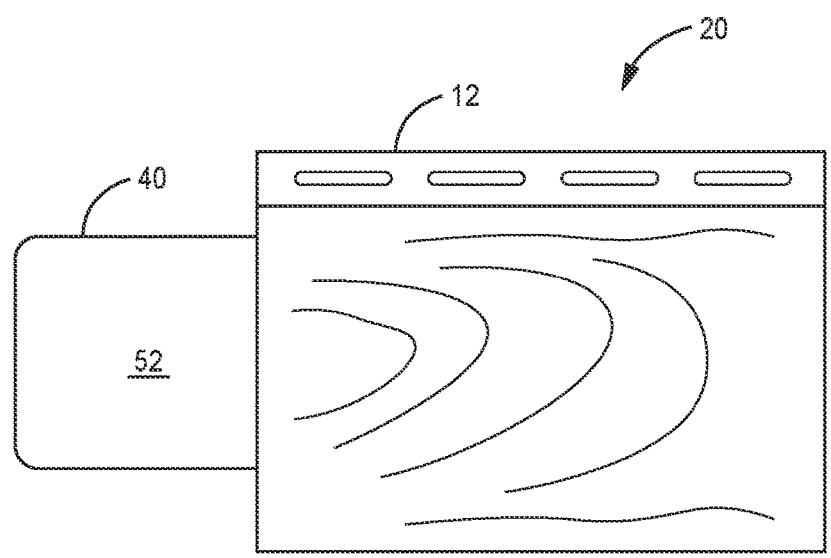
FIG. 2 is a plan view of a single "clapboard" siding unit.

FIG. 2 is another embodiment of the siding unit as disclosed period.

FIG. 2 has siding at 20 with siding number 21 and nailing flange. Installed on the reverse of the siding member 21 is the tape 40, with the exposed adhesive layer 52 shown, and the balance of the tape not shown and hidden on reverse of the siding unit 20.

Figure 3:
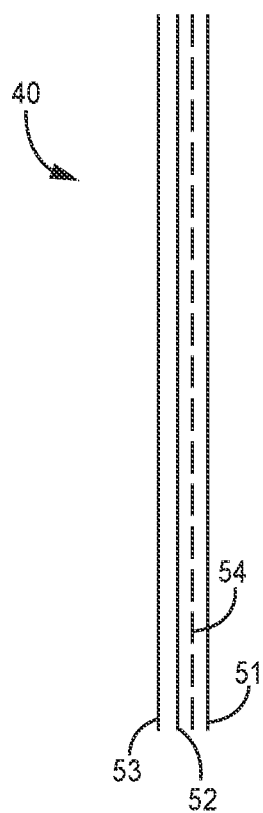
FIG. 3 is a side view of the tape.

FIG. 3 is a side view of the tape as disclosed. FIG. 3 shows tape 40 comprising polymer layer 51, adhesive layer 52, release liner 53, and optional layer 54 that can comprise a foam layer, a reinforcing layer, a pigmented or colored layer, or another optional layer.

Figure 4:
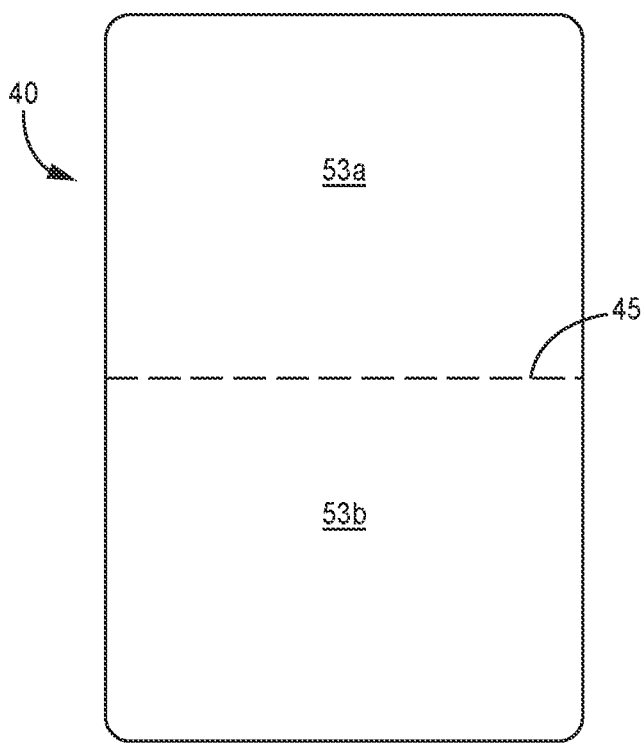
FIG. 4 is a plan view of the tape.

FIG. 4 is the plan view of the tape as disclosed. Exposed on the face of tape 40 is release liner 53a and 53b defined by division line 45.

Figure 5:
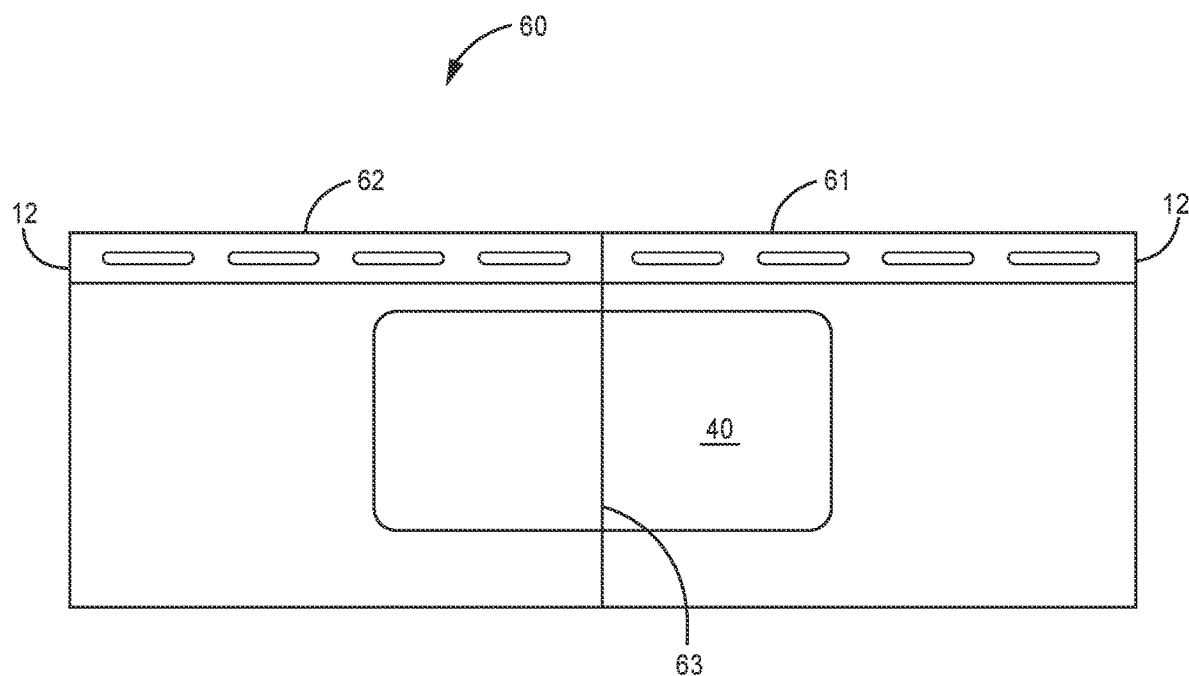
FIG. 5 is a plan view of the tape joining two siding units at a butt joint.

FIG. 5 is a representation of two members of a single course of a siding like the member of FIG. 2 and the single member of the double course of FIG. 1, in a butt joint relationship secured in place by the tape 40. FIG. 6 shows siding unit one in a butt joint relationship siding unit, siding installation 60 in a butt joint relationship with siding unit 61 and 62. The butt joint 63 is formed as the unit 61 and unit 62 come into contact at the joint, leaving little or no gap there between. This a reverse view of the joined siding units 61 and 62 showing tape 40 on the reverse side of the installation. Tape 40 shows only the outer polymer layer where in the adhesive layer is not shown and is positioned between the polymer layer and the butts joint siding units.

TABLE 3

Figuring numbering

| FIG. | Number | Description |
|---|---|---|
| FIG. 1 | 10 | Siding unit |
|  | 11 | Siding member |
|  | 12 | Nailing flange |
|  | 40a, 40b | Tape |
|  | 52 | Release liner/Exposed adhesive |
|  | 53 | Release liner/exposed adhesive |
| FIG. 2 | 20 | Siding unit |
|  | 40 | Tape |
|  | 12 | Nailing flange |
|  | 52 | Release liner/Exposed adhesive |
| FIG. 3 | 40 | Tape |
|  | 51 | Polymer layer |
|  | 52 | Adhesive |
|  | 54 | Optional layer |
| FIG. 4 | 40 | Tape |
|  | 53a and 53b | Release liner |
|  | 45 | Division between adhesive sections |
| FIG. 5 | 61 | Siding unit |
|  | 62 | Siding unit |
|  | 63 | Butt joint |
|  | 40 | Tape |
|  | 12 | Nailing Flange |

All scientific and technical terms used herein have meanings commonly used in the art unless otherwise specified. The definitions provided herein are to facilitate understanding of certain terms used frequently herein and are not meant to limit the scope of the disclosure.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

The term "comprises", and variations thereof do not have a limiting meaning where these terms appear in the description and claims.

The disclosure is illustrated by the following figures. These figures, materials, amounts, and procedures are to be interpreted broadly in accordance with the scope and spirit of the disclosure as set forth herein.

As used in this specification and the appended claims, the term "or" is generally employed in its sense including "and/or" unless the content clearly dictates otherwise. "Include," "including," or like terms means encompassing but not limited to, that is, including and not exclusive.

The complete disclosure of all patents, patent applications, and publications cited herein are incorporated by reference. If any inconsistency exists between the disclosure of the application and the disclosure(s) of any document incorporated herein by reference, the disclosure of the application shall govern. The foregoing detailed description and examples have been given for clarity of understanding only. No unnecessary limitations are to be understood therefrom. The disclosure is not limited to the exact details shown and described, for variations obvious to one skilled in the art will be included within the disclosure defined by the claims.

Unless otherwise indicated, all numbers expressing quantities of components, molecular weights, and so forth used in the specification and claims are to be understood as being modified in all instances by the term "about." Accordingly, unless otherwise indicated to the contrary, the numerical parameters set forth in the specification and claims are approximations that may vary depending upon the desired properties sought to be obtained by the present disclosure. At the very least, and not as an attempt to limit the doctrine of equivalents to the scope of the claims, each numerical parameter should at least be construed considering the number of reported significant digits and by applying ordinary rounding techniques.

Notwithstanding that the numerical ranges and parameters setting forth the broad scope of the disclosure are approximations, the numerical values set forth in the specific examples are reported as precisely as possible. All numerical values, however, inherently contain a range necessarily resulting from the standard deviation found in their respective testing measurements.

All headings are for the convenience of the reader and should not be used to limit the meaning of the text that follows the heading, unless so specified.

What is claimed is:

1. A siding system comprising:
   (a) composite a siding member comprising a thermoplastic polymer and glass fiber composite, the composite siding member composite having a COTE less than $2.0\times10°$ in/in/° F.; and
   (b) a tape adhered to the composite siding member comprising a tape film and an adhesive layer, the tape having a portion thereof adhered to the composite siding member and a remaining portion thereof having the adhesive layer covered by a release liner;
      (i) the tape having a tensile modulus greater than about 50,000 psi and polymer memory;
      (ii) the adhesive layer having a peel strength of greater than 5 lb./lineal inch and comprising at least 10 wt. % of a polymer with a Tg less than $-10°$ C.; wherein the composite siding member comprises greater than 5 vol. % glass fiber and less than 95 vol. % polymer.

2. The siding system of claim 1 wherein the composite siding member has a COTE of less than $1\times10°$ in/in/° F.

3. The siding system of claim 1 wherein the thermoplastic polymer comprises PVC and the glass fiber; wherein the glass fiber 1s coated with an interfacial modifier.

4. An environmentally stable siding system comprising:
   (a) a composite siding member comprising a thermoplastic polymer, the composite siding member having a COTE less than $2\times10°$ in/in/° F.; and
   (b) adhered to the composite siding member is a tape comprising a tape film and an adhesive, the tape having a portion of the tape thereof adhered to the composite siding member and a remaining portion thereof having an adhesive layer covered by a release liner;
      (i) the tape having a tensile modulus greater than about 50,000 psi and polymer memory;
      (ii) the adhesive layer having a peel strength of greater than 5 lb./lineal inch and comprising at least 10 wt. % of a polymer with a Tg less than $-10°$ C.; wherein the composite siding member comprises greater than 5 vol. % glass fiber and less than 95 vol. % polymer.

5. The environmentally stable siding system of claim 4 further comprising a reinforcing fiber mixed with the thermoplastic polymer to form a composite.

6. The environmentally stable siding system of claim 5 wherein the composite siding member has a COTE of less than $1\times10°$ in/in/° F.

7. The environmentally stable siding system of claim 5, wherein the thermoplastic polymer comprises PVC and the glass fiber; wherein the glass fiber is coated with an interfacial modifier.

8. A siding comprising:
   at least a first siding member and a second siding member in a butt joint relationship;
   the first and second siding members installed on a vertical rough construction surface;
   the first and second siding members comprising a thermoplastic polymer and a glass fiber composite, the first and second siding member each having a COTE less than $2\times10^{-5}$ in/in/° F.;
   adhered to a reverse side of each of the first and second siding members spanning the butt joint, a tape having an adhesive layer between a tape film and the first and second siding members;
   wherein the tape has a tensile modulus greater than about 0.8 GPa and polymer memory; the adhesive layer has a peel strength of greater than 5 lb./lineal inch and comprising at least a 10 wt. % of a polymer with a Tg less than less than $-10°$ C.; and wherein the composite of the first and second siding members comprises greater than about 5 vol. % glass fiber and less than about 95 vol. % of polymer.

9. The siding of claim 8 further comprising a space of less than 0.5 mm between the first siding member and the second siding member.

10. The siding of claim 8 further comprising the glass fiber; wherein the glass fiber has a coating of an interfacial modifier.

11. The siding of claim 10 further comprising an organometallic interfacial modifier.

12. The siding of claim 8 wherein there is no gap at the butt joint.

13. The siding of claim 11 wherein the first and second siding members have a COTE of less than $1\times10^{-6}$ in/in/° F.

14. The siding of claim 12 wherein a fish mouth is not formed at the butt joint when subjected to an environmental stress.

15. The siding of claim 11 wherein the thermoplastic polymer comprises PVC.

* * * * *